United States Patent [19]

Key et al.

[11] Patent Number: 5,008,902
[45] Date of Patent: Apr. 16, 1991

[54] AUTOMATIC BAUD RATE DETECTION

[75] Inventors: Gary R. Key, Round Rock; David C. Black, Austin, both of Tex.

[73] Assignee: International Business Machines Corp., Armonk, N.Y.

[21] Appl. No.: 302,172

[22] Filed: Jan. 25, 1989

[51] Int. Cl.$^5$ ............................................. H04B 3/46
[52] U.S. Cl. .................................... 375/10; 375/121; 370/84
[58] Field of Search ..................... 375/10, 13, 121; 370/84; 324/78 R, 78 Z; 328/151; 340/825.65

[56] References Cited

U.S. PATENT DOCUMENTS

| | | | |
|---|---|---|---|
| 3,626,306 | 12/1971 | Puckette | 328/22 |
| 3,696,338 | 10/1972 | Preiss | 364/200 |
| 4,225,960 | 9/1980 | Masters | 375/108 |
| 4,270,205 | 5/1981 | DeShon | 375/8 |
| 4,390,947 | 6/1983 | DeShon | 364/200 |
| 4,418,322 | 11/1983 | Chang | 331/1 A |
| 4,468,752 | 8/1984 | Chatham | 375/110 |
| 4,547,877 | 10/1985 | Lehman et al. | 370/84 |
| 4,597,089 | 6/1986 | Motley et al. | 375/15 |
| 4,606,044 | 8/1986 | Kudo | 370/84 |
| 4,663,766 | 5/1987 | Bremer | 375/114 |
| 4,726,040 | 2/1988 | Acampora | 370/84 |
| 4,745,621 | 5/1988 | Sawaya et al. | 375/10 |
| 4,748,625 | 5/1988 | Krause et al. | 375/34 |
| 4,756,007 | 7/1988 | Quresh et al. | 375/37 |
| 4,761,800 | 8/1988 | Lese et al. | 375/117 |

Primary Examiner—Douglas W. Olms
Assistant Examiner—Stephen Chin
Attorney, Agent, or Firm—L. Keith Stephens

[57] ABSTRACT

Method for determining the baud rate of a data stream by comparison of captured data to known autobaud characters. Samples are received from the communication device and stored in memory until a set of the samples are accumulated. Then, a sample clock is divided in half and the odd numbered samples are compared to a set of known autobaud characters. If a match occurs, then the sample clock is assumed to be correctly synchronized with the incoming serial data stream. If a match does not occur, then the even samples are recirculated and eight more samples are collected. The sample clock is again divided in half and the odd numbered samples are compared to the set of known autobaud characters. If a match occurs, then the sample clock is assumed to be correctly synchronized with the incoming data stream. These steps are repeated until an autobaud character match is found or an error situation is determined.

6 Claims, 3 Drawing Sheets

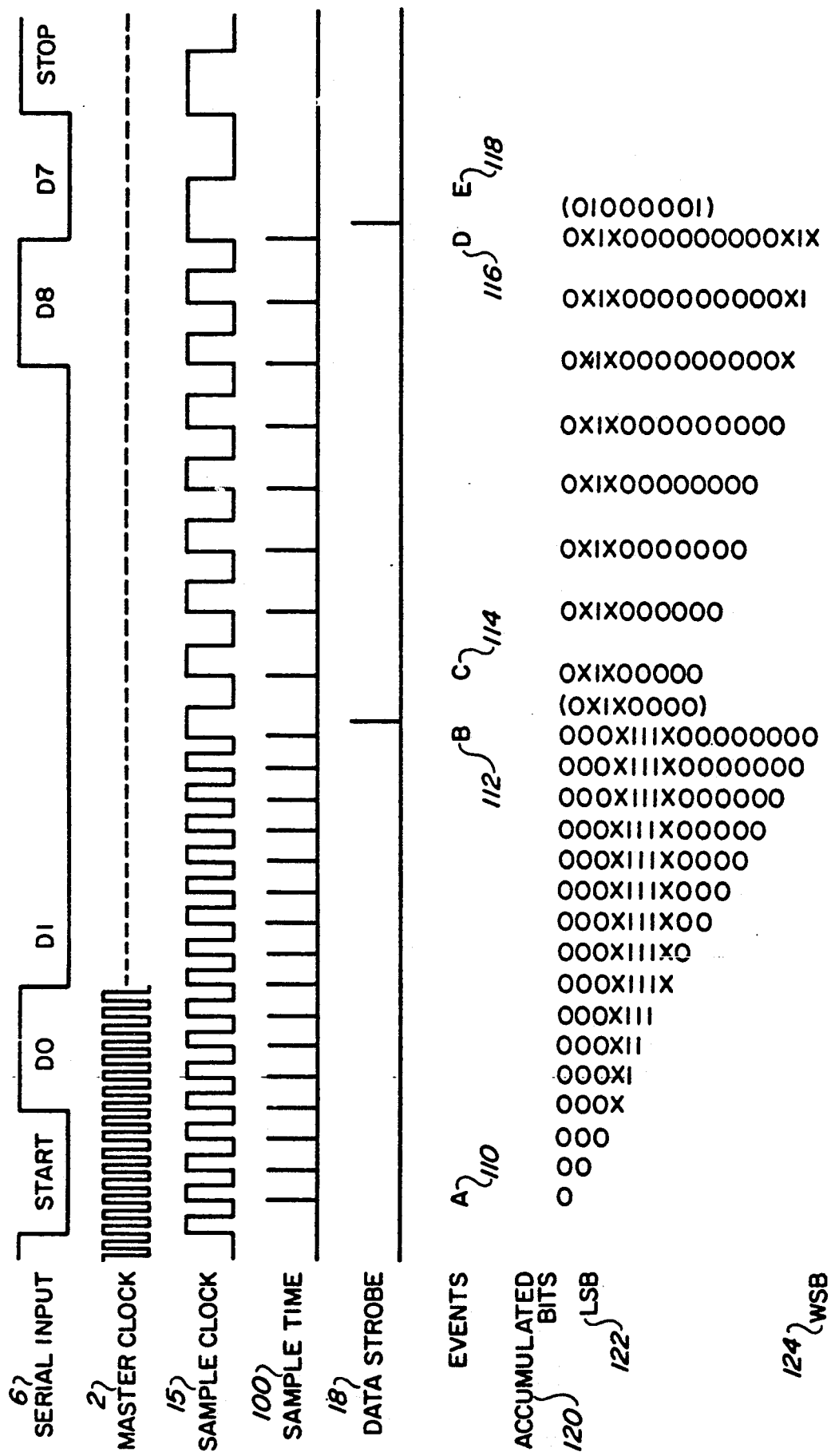

AUTOMATIC BAUD RATE DETECTION

FIELD OF THE INVENTION

The present invention is a new method for automatically detecting the correct baud rate of a communication transmission.

BACKGROUND OF THE INVENTION

Automatic baud rate detection (autobaud) is used in current communication products such as modems, printers and plotters to facilitate the proper synchronization of transmission rates to send information such as data over a communication medium. It is necessary to synchronize the sending and receiving data transmission devices in order to assure that the information is correctly interpreted and no errors are incurred in the transmission. Baud is a communication term corresponding to bits per second (bps). Thus, 4,800 baud is 4,800 bits per second over the communication medium.

Two early examples of autobaud communication circuitry are found in U.S. Pat. No. 3,626,306 to Puckette and U.S. Pat. No. 3,696,338 to Preiss. These patents discuss techniques for synchronizing data transmissions employing the recognition of zero slope points of the received analog waveform and varying the transmission rates based on the presence or absence of information. Neither of these early techniques is as accurate or flexible as the present invention.

To date, the most common method for automatically determining the baud rate of a serial data stream has been to measure the duration of the start bit. This mechanism depends on the user device sending a specified character (autobaud character) as the first character of the session. This character typically has the characteristic of its Least Significant Bit (LSB) being a one (mark).

Technique of prior art approaches measures the duration of the start bit of the autobaud character to determine the baud rate of the transmitted information. However, industry standards for the timing of bits in a serial data stream are imprecise so that the width of the start bit may vary as much as fifty percent. This imprecision combined with the possibility of an erroneous character being sent instead of the correct autobaud character often cause incorrect baud rates to be selected.

Techniques using a start bit in an autobaud character are exemplified in U.S. Pat. Nos. 4,225,960 to Masters; 4,270,205 and 4,390,947 to Deshon; 4,418,322 to Chang; 4,468,752 to Chatham; 4,597,089 to Motley et al.; 4,663,766 to Bremer; 4,748,625 to Krause et al.; and 4,761,800 to Lese et al. This technique provides an accurate determination of the transmission rate, but it requires inflexible data information in each transaction. Techniques using measurement of the start bit duration place unnecessary performance constraints on the communication system and limit the accuracy and flexibility of the transmission medium.

SUMMARY OF THE INVENTION

It is therefore an object of the present invention to automatically detect the baud rate of serial information in an accurate manner.

It is a further object of the invention to eliminate the effect of bit distortion in the autobaud character.

It is another object of the invention to inherently generate timing that is useful once the autobaud character has been received.

It is yet another object of the invention to increase the flexibility of implementation options by simplifying the steps necessary to detect the baud rate of the transmission.

According to the invention, these objects are accomplished by sampling the incoming serial data stream at twice the highest baud rate. The samples are stored in memory means until a plurality of samples are accumulated. Then, the sample clock is divided in half and the odd numbered samples are compared to the known autobaud characters. Only the high order seven bits are compared, so the eighth bit is treated as a default start bit. If a match occurs, then the sample clock is assumed to be correctly synchronized with the incoming serial data stream.

If a match does not occur, then the even samples are loaded into the low order bits of the memory means and eight more samples are collected. Thus, the original samples are now in the high order bits of the memory means. The sample clock is again divided in half and the odd numbered samples are compared to the known autobaud characters. If a match occurs, then the sample clock is assumed to be correctly synchronized with the incoming data stream. These steps are repeated until an autobaud character match is found or an error situation is recognized.

BRIEF DESCRIPTION OF THE DRAWINGS

The foregoing and other objects, aspects and advantages of the invention will be better understood from the following detailed description of a preferred embodiment with reference to the drawings in which:

FIG. 2 is a timing diagram of the automatic baud rate detection apparatus in accordance with the present invention.

DETAILED DESCRIPTION OF THE INVENTION

Figure 1:
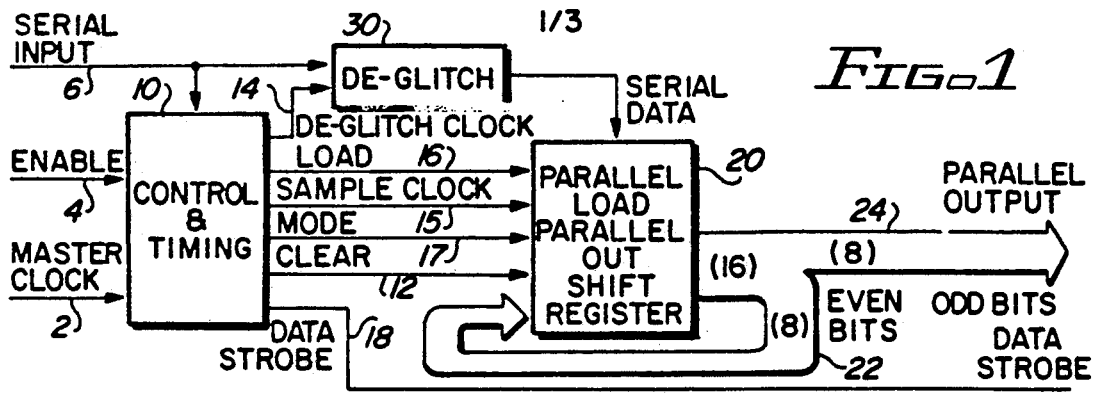
FIG. 1 is a block diagram of the automatic baud rate detection apparatus in accordance with the present invention.

FIG. 1 is a simplified block diagram of an automatic baud rate detection apparatus in accordance with the present invention. The major elements of the apparatus are the Timing and Control Block 10 and the Shift Block 20. The De-glitch Block 30 is an optional circuit used to reduce the effect of noise on the incoming data stream. The function of each of the blocks is understood best in terms of the input and output signals under each blocks control. Thus, a discussion of each of the blocks and their corresponding signals will be helpful to understand the processing.

The Timing and Control Block 10 receives pulses from the Master Clock an input 2 and controls the timing for the other processing by the other blocks. In the idle state, Enable 4 is not asserted which causes Clear 12 to be asserted to the Shift Register Block 20. When Enable 4 is asserted, Clear 12 is held asserted until the beginning of the start bit is received on the Serial Input line 6 at which time all of the timing functions commence.

The De-glitch Clock 14 is a clock that runs sixteen times as fast as the Sample Clock 15. The De-glitch Clock 14 is employed as a clock by the De-glitch Block 30 for optional noise reduction on the incoming data stream. The load 16 and Mode 17 signals are used to control the operation of Shift Register 20. Mode 17 determines whether Shift Register 20 shifts incoming serial data, or load Shift Register's parallel inputs 22. Load 16 clocks parallel data loading.

Parallel Output 24 consists of sixteen bits of data. The odd bits are used for comparison to the possible autobaud characters. In the event a match with the autobaud characters does not occur, then the even bits of data are looped back to Shift Register Parallel Inputs 22.

FIG. 2 illustrates the basic timing of the signals in accordance with the present invention. The example depicted uses ASCII data representative of the character "A" (Hex 41, Binary 01000001). The baud rate of this character is one-half of the maximum allowable baud rate. For example, if the maximum is 9600 baud, then the sample character is shown at 4800 baud.

Corresponding signals in FIG. 1 and FIG. 2 bear identical numbers to correlate corresponding functions.

Serial Input 6 is the serial data stream received over the communication medium. In the example, the serial data stream is the binary representation of the ASCII character "A" transmitted at 4800 baud.

Master Clock 2 is a clock with a frequency of twice the highest cognizant baud rate, i.e. 19,200 Hertz. It is important to recognize that the highest clock frequency used in the autobaud apparatus is dependent on the implementation. For example, if the De-glitch apparatus is used, then the clock rate might be required to be as fast as thirty-two times the highest baud rate.

Sample Clock 15 enables the shifting of serial data into the Shift Register 20. The Sample Clock 15 starts at twice the highest baud rate, and decreases in frequency as the search for the autobaud character proceeds.

Sample Time 100 is shown for purposes of this discussion only, and represents the time at which the shift registers shift their contents.

Data Strobe 18 indicates the time when the shift register data is valid.

Events A 110, B 112, C 114, D 116 and E 118 are markers used in the discussion of timing.

Accumulated Bits 120 represent the output of the Shift Register 20 after each sample time for the example. The values are shown with the Least Significant Bit (LSB) 122 at the top and the Most Significant Bit (MSB) 124 at the bottom. The values in parentheses are the outputs after the even bits are recirculated into the Shift Register 20 as Parallel Input 22.

Event A 110 is the time at which the first bit is shifted into the Shift Register 20. This event requires Enable 4 to be active, the start bit must be received over the Serial Input line 6 and the Sample Clock 15 must occur.

Event B 112 is the point when the first sixteen samples are shifted into the Shift Register 20, and the comparison to the autobaud character occurs. Data Strobe 18 is active at this point.

Event C 114 is the point at which the first sample is taken at the reduced sample rate.

Event D 116 is the time when the next eight samples are taken, and the next comparison to the autobaud character is made. Data Strobe 18 is active again at this point.

Event E 118 is the point at which the autobaud character is matched and the baud rate is determined. At this point, the automatic baud rate apparatus can be reset in anticipation of the next data transmission.

Figure 3B:
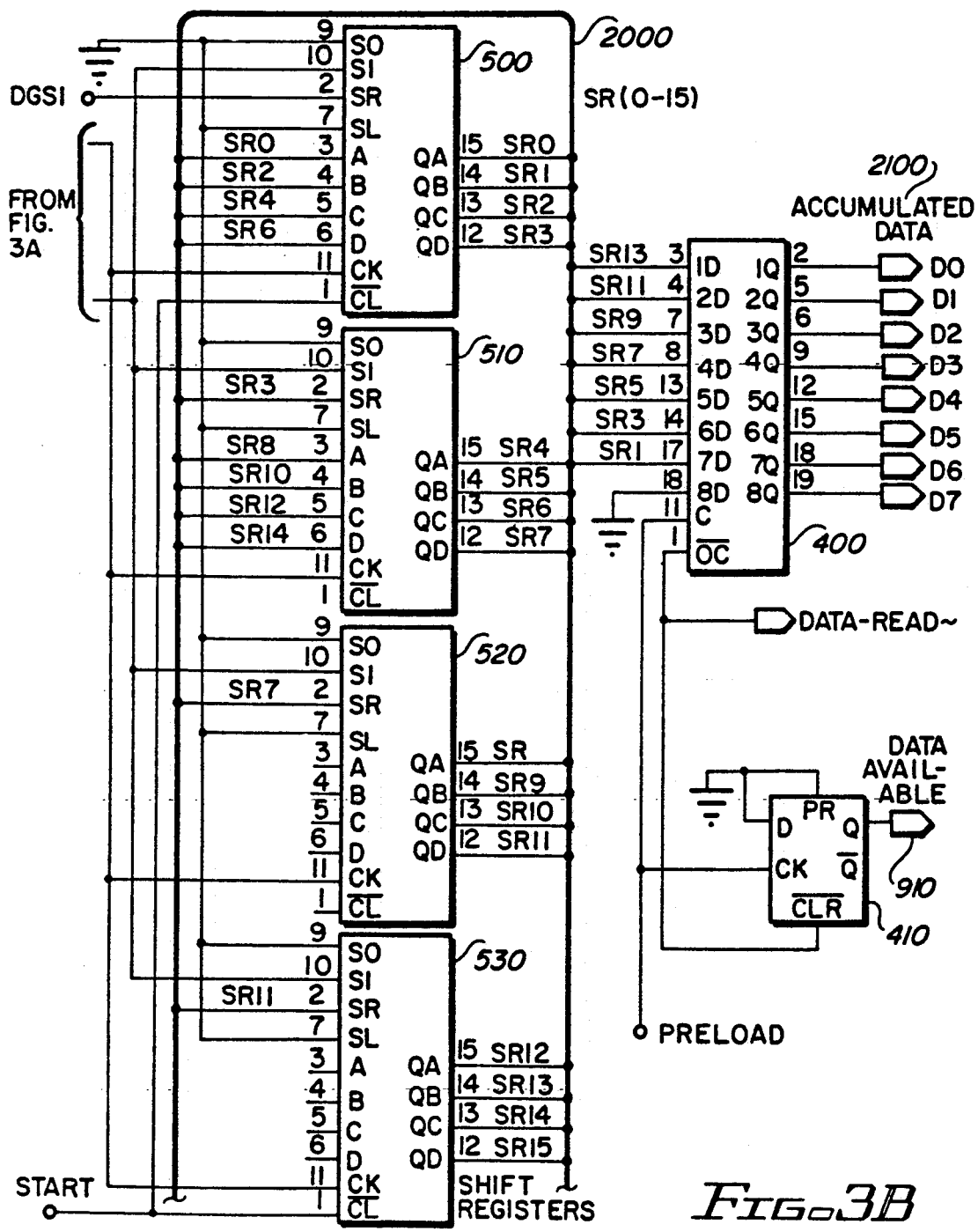
FIG. 3 is a schematic of automatic baud rate hardware in accordance with the present invention.
Figure 3A:
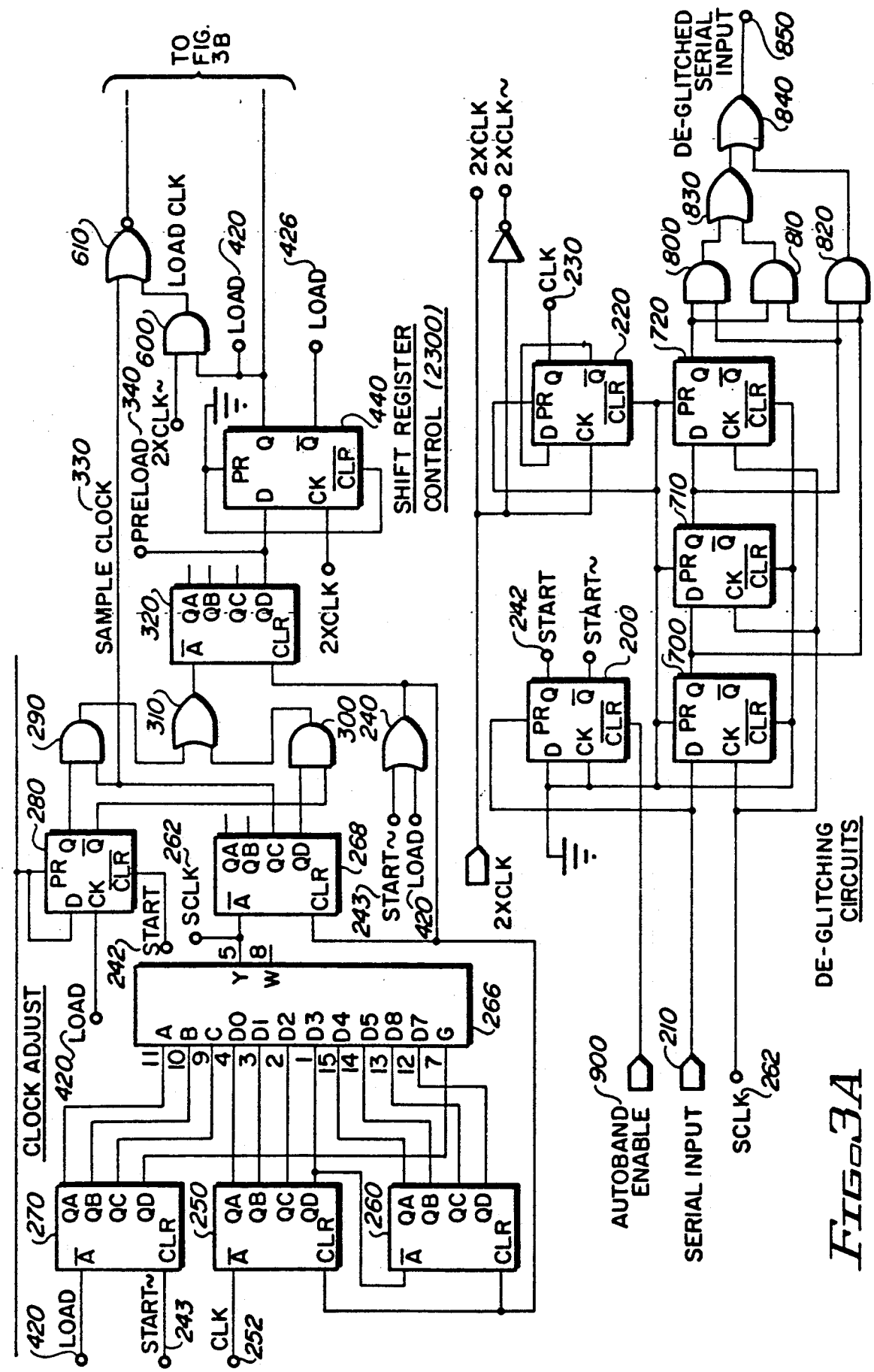

FIG. 3 is a detailed hardware schematic depicting an implementation of an automatic baud rate detection apparatus in accordance with the present invention. All numbered references on the circuitry refer to TTL integrated circuits described in the *TTL Data Book*, published by Texas Instruments (1985). A set of four shift registers 2000 are used to acummulate the data as it is received. The shift registers 2000 are managed by the shift register control circuitry 2300 to accumulate the processed data in a single register 2100. The accumulated data 2100 is checked against the pre-stored autobaud information to determine if the clocking has been synchronized.

The detailed operation of the circuitry is best understood with reference to the schematic circuitry in which the flip-flop at 200 is held clear until autobaud enable (ABDEN) is asserted. Its outputs are used to hold other parts of the circuitry in the cleared or idle state. The flip-flop 200 is set (and so asserting START) when the serial input (SI) 210 first goes low, which is the leading edge of the incoming serial data stream.

The flip-flop at 220 divides the 2XCLK by two, to provide CLK 230.

The or gate at 240 is used to hold various counters cleared until START 242 is asserted, and to synchronize timing.

The counters at 250 and 260 are used to divide CLK 252 in binary steps and present these individual clocks simultaneously to the data selector at 266.

The counter at 270 is used to count the number of times the incoming serial data stream has been tested against the desired autobaud character. This count is presented to the data selector at 266 as the select inputs.

The data selector at 266 is used to select the correct clock frequency for SCLK 262 based on the count from counter 270. SCLK 262 is the sample clock used to collect samples from the incoming data stream 210.

The flip-flop at 280 indicates that more than one set of samples have been collected. The first set consists of sixteen samples. All subsequent sets consist of eight samples.

An gates 290 and 300 are ored through or gate 310 to generate a clock to 320 that is sixteen times the period of SAMPLE-CLK 330 for the first set of samples, and eight times thereafter.

Counter 320 generates PRELOAD 340 which performs three functions. The first function is to strobe data into register 400 for external use. The second function generates flag 410 (DATA-AVAIL) to indicate that data is available for comparing to the autobaud character. The third function generates LOAD at 420.

The flip flop at 440 generates the LOAD 420 and LOAD~426 signals used in various places for synchronization, and by the shift registers 500, 510, 520, and 530.

And gate 600 and nor gate 610 are placed in series to generate sample clocks of the proper timing for the shift registers 500, 510, 520, and 530.

The shift registers 500, 510, 520, 530 are used to collect the incoming data at the sample clock times, and to present the proper data to the register 400.

The flip-flops at 700, 710 and 720 combine with the and gates 800, 810, 820 and the or gates 830 and 840 to generate a de-glitched version of the serial data stream 850.

When autobaud 900 is enabled and the leading edge of the start bit of the serial data stream is detected at 210, START 242 is asserted, releasing the clears at counters 270, 250, and 260. The outputs of counters 250 and 260 commence their count down CLK 230 to provide clocks that are in binary steps.

The SCLK 262 rate is selected by data selector 266 based on the point in the process as determined by the number of times a comparison has been made of the data at the outputs. This is accomplished by counting the number of LOAD 420 pulses that have occurred at counter 270.

SCLK 262 is further divided by sixteen for the first cycle or eigth for all other cycles by the gates 268, 280, 290, 300, 310, and 320 to provide SAMPLE-CLK 330 and PRELOAD 340.

PRELOAD 340 strobes data into the output register 400, and sets the data ready flag at 410 at the end of each collection cycle. It used in conjunction with gates 440, 600 and 610 to provide load and shift clocks to the shift registers 500, 510, 520, and 530.

Shift registers 500, 510, 520, and 530 are used to collect the samples of the serial data. Their odd outputs are used to compare against desired data, while their even outputs are recirculated (reloaded) in the event the comparison fails.

The process of data collection, comparison, and recirculating continues until either the desired data is detected or an error condition is detected.

The following is a discussion of how the circuit in FIG. 3 could be used in a system to aid in the recognition of one of several autobaud characters. Also, mention is made of how other useful information may be obtained from the circuit.

In an all hardware system, the outputs of the register at 2100 are routed to a bank of registers. One register for each of the autobaud characters and a comparator that receives individual characters to be compared to each of the autobaud characters. The comparison is made when DATA_AVAILABLE 910 is true. If the comparison fails, the DATA_AVAILABLE 910 flag is reset by comparator circuitry, and the detection process continues.

In a software environment, the DATA_AVAILABLE 910 flag would generate an interrupt to activate a controller program to compare the information obtained from the serial input 210 to the known autobaud characters and reset the DATA_AVAILABLE 910 flag.

Additional features can be added to the autobaud circuitry of FIG. 3 to handle other related functions. For example, to stop the autobaud search upon detection of the first valid character, an AND gate can be added to the LOAD input counter 270. The inputs to this gate are LOAD 420 and a signal from the comparator circuit (or from an input controlled by software) that indicates that the desired character has been found.

The purpose of this gate is to stop the process, and hold all clocks at the right frequencies. The sample clock is synched at the right rate for the baud rate of the serial data as a result of this processing.

Additionally, if an indicator of what the baud rate was determined to be were needed, the ouputs of 270 have a direct binary relationship to the baud rate of the received autobaud character. This value is read by software or reported by hardware.

The autobaud rate method and apparatus of the present invention has the following advantages over the traditional approach of measuring the start bit duration.

First, the effect of start bit duration is minimized.

Second, the method inherently generates timing that is useful once the autobaud character has been received. For example the de-glitch clock would adjust in period as the search goes on to lower baud rates. Also the sample clock finishes the baud rate detection processing at the desired baud rate for continued operation.

Finally, the method and apparatus are flexible enough to adapt to situations where any of several autobaud characters are used by employing additional registers and comparators.

While the discussion has primarily centered on a hardware implementation with shift registers and comparators, software and memory could readily be substituted to achieve the same results. The pre-selected autobaud characters could be stored in an array of sufficient size to also accommodate the serial data. Thus, although a preferred embodiment of the invention has been illustrated and described, those skilled in the art will recognize that this invention may be practiced with modification using other and different hardware and software to meet particular application requirements within the spirit and scope of the appended claims.

Having thus described my invention, what I claim as new and desire to secure by Letters Patent is as follows:

1. Method for automatically detecting transmission rate of a stream of data, comprising:
   (a) sampling the data at a rate faster than the highest possible baud rate;
   (b) storing the sampled data in a memory;
   (c) comparing the sampled data to known data;
   (d) determining if a match occurs;
   (e) selecting the matched baud rate if a match occurs;
   (f) recirculating a portion of the sampled data if a match does not occur; and
   (g) repeating steps (a) to (f) until a match occurs.

2. Method for automatically detecting the baud rate of a stream of data as recited in claim 1, further comprising:
   (a) collecting eight bits of data;
   (b) collecting eight additional bits of data;
   (c) comparing the sixteen bits of data to a known sixteen bits of data;
   (d) recirculating eight bits of the collected data if a match does not occur; and
   (e) repeating steps (b), (c), and (d) until a match occurs.

3. Method for automatically detecting the baud rate of a stream of data as recited in claim 1, further comprising error processing for detecting no possible matches.

4. Apparatus for automatically detecting the baud rate of a stream of data, comprising:
   (a) means for sampling the datat at a rate faster than the highest possible baud rate;
   (b) means for storing the sampled data in a memory;
   (c) means for comparing the sampled data to known data;
   (d) means for determining if a match occurs;
   (e) means for selecting the matched baud rate if a match occurs;
   (f) means for recirculating to said storing means a portion of the sampled data if a matched does not occur.

5. Apparatus for automatically detecting the baud rate of a stream of data as recited in claim 4, further comprising:
   (a) means for collecting eight bits of data;
   (b) means for collecting eight additional bits of data; wherein said comparing means compares the collected sixteen bits of data to a known sixteen bits of data and said recirculating means recirculates to said storing means eight bits of the collected data if a match does not occur.

6. Apparatus for automatically detecting the baud rate of a stream of data as recited in claim 5, further comprising means for performing error processing for detecting no possible matches.

* * * * *

UNITED STATES PATENT AND TRADEMARK OFFICE
CERTIFICATE OF CORRECTION

PATENT NO. : 5,008,902
DATED : April 16, 1991
INVENTOR(S) : Key et al.

It is certified that error appears in the above-identified patent and that said Letters Patent is hereby corrected as shown below:

```
In column 1 at line 49 change "Deshon" to --DeShon--.

In column 2 at line 24 change "unti" to --until--.

In column 2 at line 60 change "unti" to --until--.

In column 2 at line 68 change "load" to --Load--.

In column 5 at line 8 change "eigth" to --eight--.
```

Signed and Sealed this

Twenty-third Day of May, 1995

Attest:

BRUCE LEHMAN

Attesting Officer     Commissioner of Patents and Trademarks